(12) United States Patent
Floyd (10) Patent No.: US 10,954,116 B1
(45) Date of Patent: Mar. 23, 2021

(54) DRIVE SYSTEM FOR APPLYING GASOLINE TO A HYBRID VEHICLE FUEL-TANK LESS FREQUENTLY VIA AN ENGINE CONTROL-UNIT (ECU) ONBOARD COMPUTER

(71) Applicant: Herbert Ray Floyd, New York, NY (US)

(72) Inventor: Herbert Ray Floyd, New York, NY (US)

( * ) Notice: Subject to any disclaimer, the term of this patent is extended or adjusted under 35 U.S.C. 154(b) by 0 days.

(21) Appl. No.: 16/894,278

(22) Filed: Jun. 5, 2020

Related U.S. Application Data (63) Continuation-in-part of application No. 16/206,994, filed on Nov. 30, 2018, now abandoned.

(51) Int. Cl.
| | |
|---|---|
| *B67D 7/04* | (2010.01) |
| *B60W 10/08* | (2006.01) |
| *B60W 10/06* | (2006.01) |
| *B60W 10/26* | (2006.01) |

(52) U.S. Cl.
CPC ........... *B67D 7/0401* (2013.01); *B60W 10/06* (2013.01); *B60W 10/08* (2013.01); *B60W 10/26* (2013.01); *B60W 2300/26* (2013.01); *B60W 2510/24* (2013.01); *B67D 2007/0442* (2013.01)

(58) Field of Classification Search
CPC ...... B60W 20/20; B60W 10/06; B60W 10/08; B60W 20/13; B60L 53/24; B60L 11/1814; B60Y 2200/92; B60K 6/40; B60K 6/44; B60K 35/00; Y10S 903/93; Y10S 903/951

USPC ..... 180/65.21, 65.265, 65.27, 65.275, 65.31; 701/22.2

See application file for complete search history.

(56) References Cited

U.S. PATENT DOCUMENTS

| | | | | | |
|---|---|---|---|---|---|
| 5,998,901 | A | * | 12/1999 | Kawabata | B60W 20/10 310/114 |
| 6,007,443 | A | * | 12/1999 | Onimaru | B60K 6/36 475/5 |
| 6,026,921 | A | * | 2/2000 | Aoyama | F02D 13/0238 180/65.25 |
| 2009/0277702 | A1 | * | 11/2009 | Kanada | B60L 58/12 180/65.29 |
| 2009/0309537 | A1 | * | 12/2009 | Saito | H02J 7/1415 320/101 |
| 2011/0109158 | A1 | * | 5/2011 | Olsen | H02J 3/38 307/10.1 |
| 2019/0160936 | A1 | * | 5/2019 | Lubben | B60W 20/30 |

* cited by examiner

*Primary Examiner* — Justin M Jonaitis

(57) ABSTRACT

A first, and second twin AC inverters for a hybrid vehicle, whereby, the first and second inverters having a first, and second twin AC hard wire terminal blocks, a cool-down C-D process, and a conventional Engine Control Unit computerized remote-control drive system, whereby, being capable of activating the twin AC terminal blocks for Freeway speed, hills, faster acceleration, and a hybrid vehicle momentum regenerative braking kinetic energy process for: charging a battery-pack, and multiple batteries. The computer being capable of activating the first terminal block, when the cool-down process is to end, and deactivating the second terminal block, when the cool-down process is to begin. The Computer is capable of activating the first, or second terminal blocks, whereby, for operating in conjunction with one another for the Freeway speed for charging the battery•pack, including multiple batteries with respect to the above modification.

1 Claim, 14 Drawing Sheets

FIG. 3

PRIOR ART

PRIOR ART

PRIOR ART

PRIOR ART

DRIVE SYSTEM FOR APPLYING GASOLINE TO A HYBRID VEHICLE FUEL-TANK LESS FREQUENTLY VIA AN ENGINE CONTROL-UNIT (ECU) ONBOARD COMPUTER

CROSS-REFERENCES TO RELATED APPLICATION

This application is a continuation-in-part of application Ser. No. 12/291,058, filed on Jul. 3, 2009, now abandoned, which is a continuation-in-part of Ser. No. 12/799,923, filed on May 3, 2010, now abandoned, which is a continuation-in-part of Ser. No. 13/065,001, filed on Mar. 11, 2011, now abandoned, which is a continuation in-part of Ser. No. 13/373,422, filed on Nov. 14, 2011 now abandoned, which is a continuation in part of Ser. No. 13/573,701, filed on Oct. 3, 2012 now abandoned, which, is a continuation in part of Ser. No. 15/582,498, filed on Apr. 28, 2017 now abandoned, which is a continuation in part of Ser. No. 16/206,994, filed on Nov. 30, 2018 not abandoned, but requesting a New CIP Number.

BACKGROUND OF THE INVENTION

1. Field of Invention

The present invention pertains to a hybrid vehicle, specifically to an electrical systems which are capable of causing a hybrid vehicle's fuel-tank to be filled with gasoline less frequently than a vehicle driven by a conventional internal combustion/

2. Description of the Prior Art

The US military consumes about 1.7 million Gallons of gasoline a day with respect to the Department of Defense (DOD). This invention is capable of causing reducing the fuel consumption of tanks and other hybrid tactical vehicles and the Army's fleet of manned ground vehicles. This will save the United States billions of Dollars a year.

SUMMARY OF THE INVENTION

It is the object of the present invention to produce a system for reducing the need for applying gasoline to a hybrid vehicle fuel tank by utilizing a system comprising a first and second twin inverter, a first and second twin AC hardwire terminal block each of which is defined by a cool-down process using a conventional engine management computer to remotely control the vehicle driving system. The computer is capable of activating the terminal blocks for different driving factors including freeway speed, hills, faster acceleration, and charging the vehicle battery-pack. The computer is capable of detecting, when the cool-down process is to end for the terminal block and activating the terminal block upon the end of the cool-down process. The first terminal block is capable of operating in conjunction with the second terminal block. The first and second twin inverters are capable of supplying a second electric motor/generator with AC current.

The drive system comprising eight terminals for joining a first, second, third, and fourth batteries.

The system including an instrument panel readout screen, and an ignition key-slot, the key-slot being capable of receiving the ignition key for activating the readout screen. A first switch (a) of keypad KP is adjacent to the instrument panel readout screen. The first switch is defined by a finger placement surface and shaped to conform to the contours of the fingers for activating the readout screen. Where upon activation the readout screen indicates information related to the date of prior refueling of the vehicle.

A second switch of the second twin inverter and a third switch of the first twin inverter is activated by the computer. A first conventional motor/generator is connected to a conventional power-splitting device for distributing power produced by an internal combustion engine (ICE) to a drive train's reduction gears. A second motor conventional motor/generator connected to the power-splitting device for distributing power produced by an internal combustion engine (ICE) to a drive train's reduction gears. The first conventional motor/generator connected to the first and second twin inverters. The first twin inverter being joined to a conventional batter-pack for converting the alternating current (AC) supplied by the first and second motors/generators into direct current (DC) for recharging the battery-pack.

The vehicle including a charger capable of charging the first, second, third and fourth batteries whereby an AC hardwire terminal block being fixed on the second twin inverter and connected to the battery-pack for converting DC supplied by the battery-pack to AC for activating the second motor/generator. The second motor/generator is connected to a conventional outlet of the second twin inverter by a conventional plug. The battery charger being connected to the second twin inverter. The battery charger and the second twin inverter are connected to the first, second, third and fourth batteries for activating the second motor/generator.

The above system being applicable to a mid-size hybrid vehicle, a luxury hybrid vehicle, and a heavy-duty hybrid vehicle, for instance a hybrid tactical U.S. military vehicle, using the above components sized accordingly for the size of vehicle. Wherein a mid-size hybrid vehicle would require 8,000 Watt twin inverters, a luxury hybrid vehicle would require 10,000 Watt twin inverters, and the heavy-duty hybrid vehicle would require 12,000 Watt twin inverters.

The system also using conventional means for regenerating power such as regenerative breaking as part of a friction brake system.

DETAILED DESCRIPTION OF THE PREFERRED EMBODIMENTS

Figure 1:
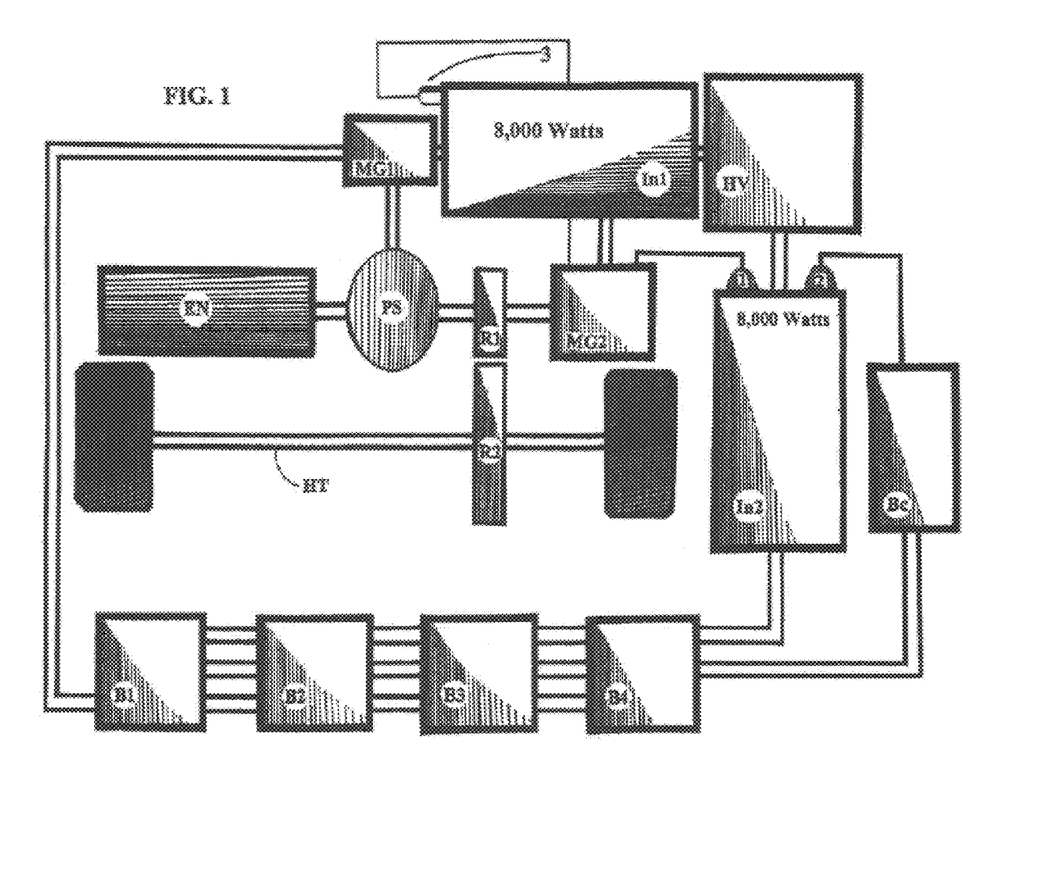
FIG. 1 is a block diagram of a mid-sized hybrid vehicle drive system having first and second twin 8,000 Watt inverters, first, second third, and fourth batteries, a battery charger, a battery pack, a conventional internal combustion engine, a power splitter, first and second motor/generators and drive train reduction gears with respect to the above modifications.
Figure 2:
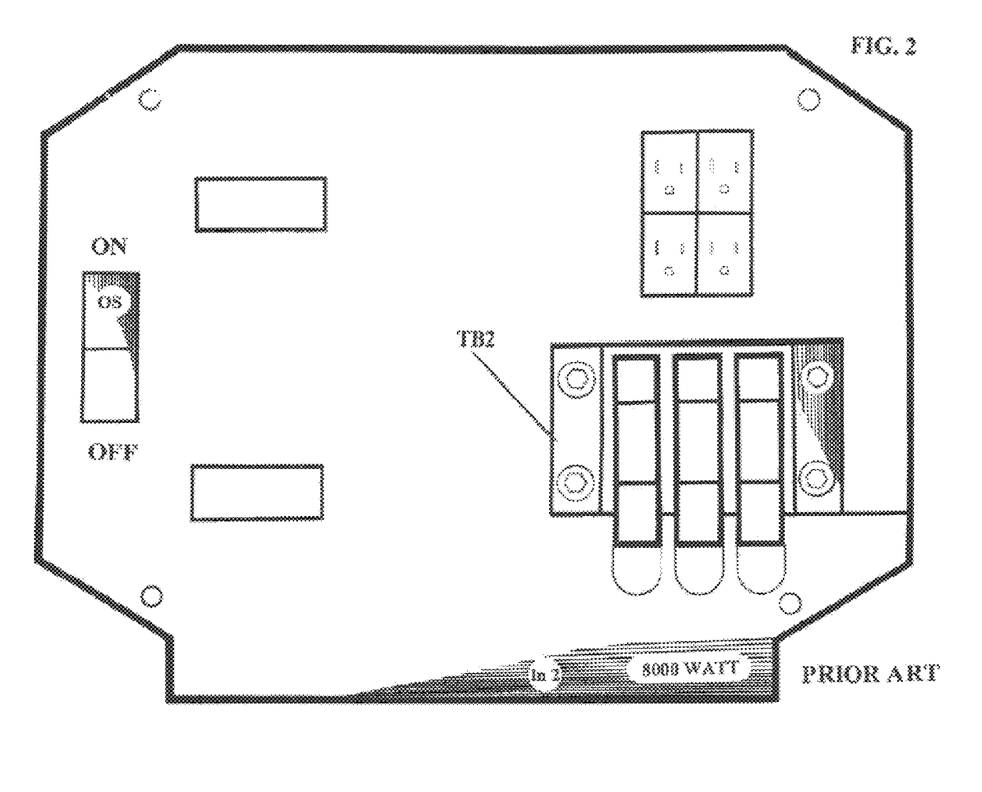
FIG. 2 is a front view of a prior art 8,000 watt remote control inverter having a hard wire direct terminal block including a switch and four conventional outlets near the terminal block.
Figure 3:
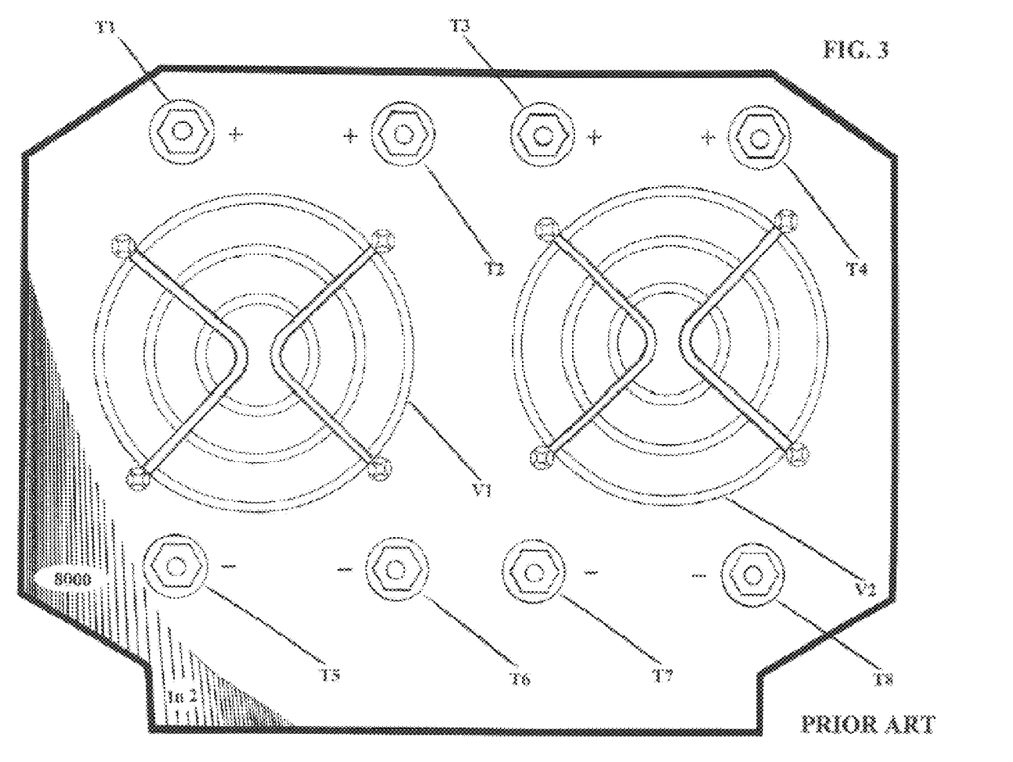
FIG. 3 is a rearward view of a prior art 8,000 watt remote control inverter having dual cooling fans and eight terminals.

FIG. 1 defines a drive system for reducing the requirement for applying gasoline to a hybrid vehicle fuel tank by having a first and second twin inverters (IN1) (IN2) which are both 8,000 Watt inverters as seen in FIGS. 2 and 3. The first and inverters including a respective AC hardwire terminal blocks (TB). Each inverter defined by a cool down-process. The vehicle's engine control-unit onboard computer (ECU) capable of activating the terminal blocks (TB) of the first and the second twin inverter for the drive system to achieve freeway speed, traverse hills, increase acceleration, and for charging the vehicle battery-pack (HV). The ECU being capable detecting when a cool-down process is to end for the first terminal block (TB) and activating the first terminal block upon said detection of the end of the process. The first terminal block is capable of operating in conjunction with the second terminal block (TB). The first and the second twin inverters (IN1) and (IN2) each being capable of supplying a second electric motor/generator (MG2) with AC current. A first electric motor/generator (MG1) being connected to a first, a second, a third, and a fourth battery (B1) (B2) (B3) (B4). The drive system including a conventional internal combustion engine (EN) connected to a power-splitting device (PS). The power-splitting device connected to the first and the second motor/generator (MG1) (MG2) and a drive train's reduction gears (R1) and (R2) to supply power, supplied by the Internal combustion engine or the first motor/generator (MG3) to a vehicle's wheels. A battery charger (BC) connected to the second power twin inverter (In2) for charging the first, second, third, and fourth batteries (B1) (B2) (B3) (B4). The first, second, third, and fourth batteries (B1) (B2) (B3) (B4) supplying energy to the vehicle by the first electric motor and the first electric motor's connection to the power-splitting device (ps). The second motor/generator (MG2) is connected to a conventional outlet of the second twin inverter (IN2) by a first plug (1), the second twin inverter (IN2) is connected to the battery charger (BC) by a second plug (2), and the first twin inverter (IN1) connected to the second motor/generator (MG2) by an a third plug (3).

FIG. 3 shows the conventional inverter including eight terminals (T)(T2)(T3)(T4)(T5)(T6)(T7)(T8) for joining the first, second, third, and fourth batteries (B1)(B2)(B3)(B4).

Figure 4:
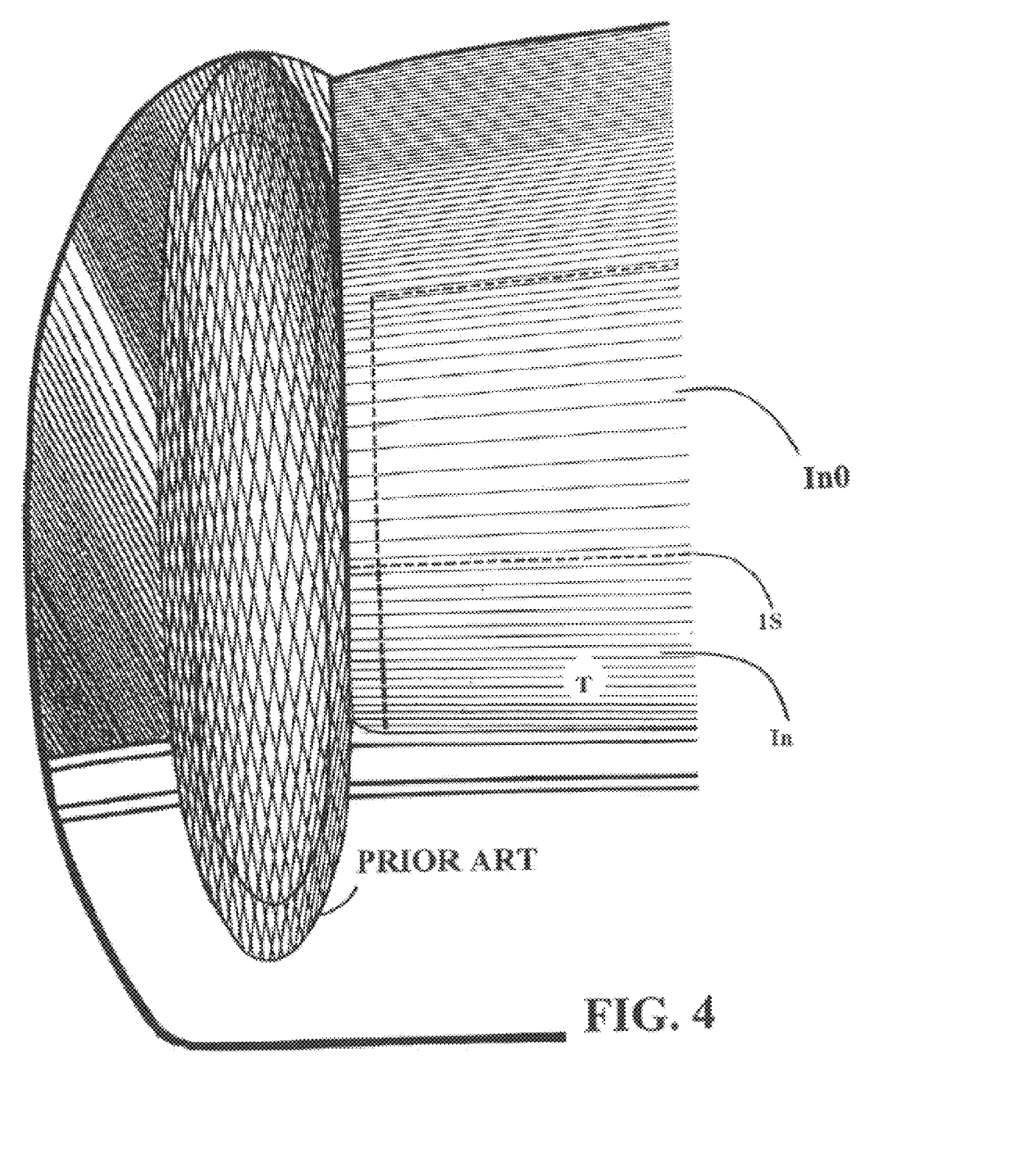
FIG. 4 is a reward view of a prior art vehicle's trunk housing the prior art inverters.

FIG. 4 shows an example arrangement of a first and second twin inverter (IN) (IN0) of a second embodiment of the apparatus in a trunk (T) of a prior art luxury vehicle.

Figure 5:
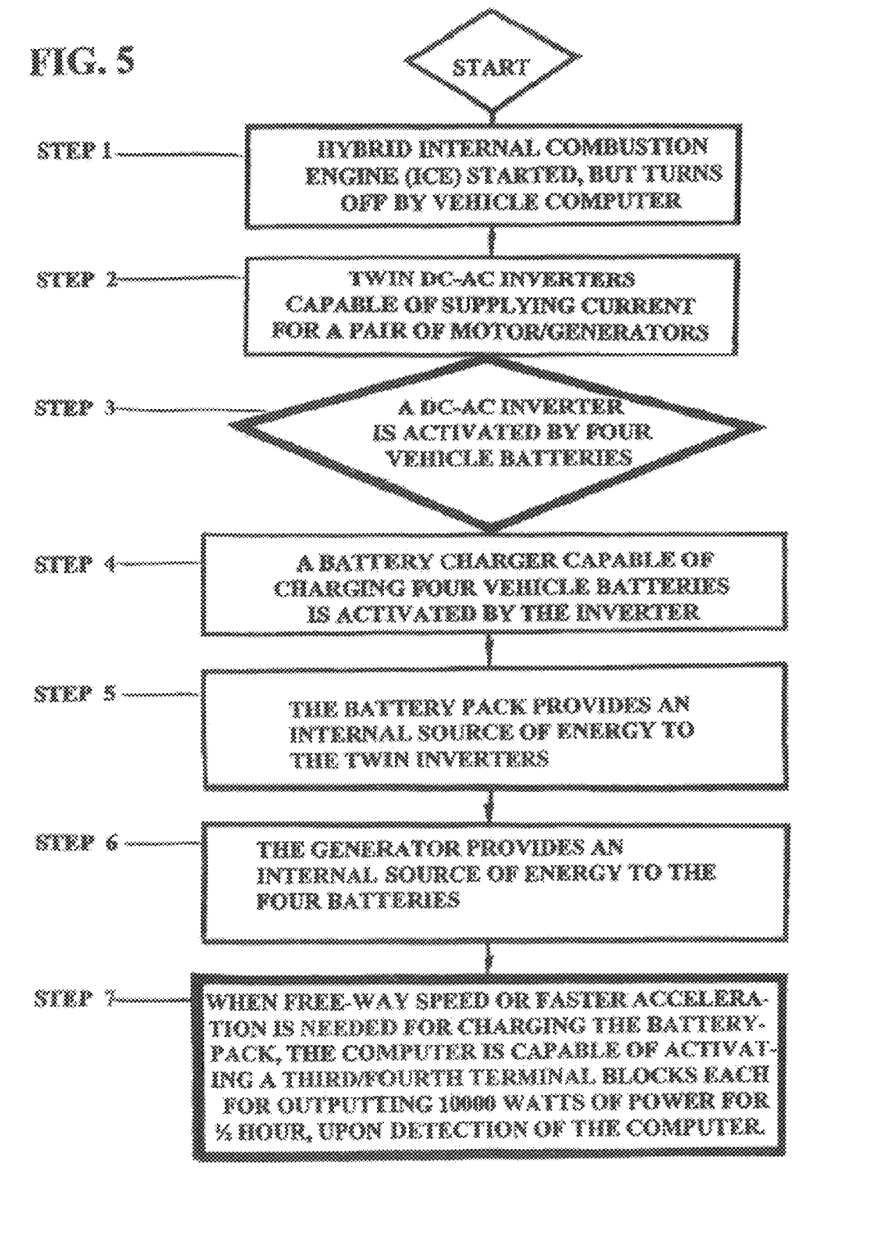
FIG. 5 is a step-by-step flowchart describing the operation of the system of FIG. 1.

The system will now be described in more detail by a step by step process as seen in the flowchart of FIG. 5.

Step 1. A hybrid internal combustion engine (EN) is started and later turns off via a computer. It is known that hybrid vehicles and all-electric vehicles create power for recharging batteries through regenerative braking (regenerative mode). Regenerative braking means capturing the momentum (kinetic energy) and turning it into electricity which is capable of recharging the vehicle's battery. The embodiments of the instant apparatus use regenerative breaking to recharge the four batteries.

Step 2. The first and second motor/generators (MG1) (MG2) are supplied current from the first and second twin inverters (IN1) (IN2). The first twin inverter (IN1) being joined to a conventional battery-pack (HV) for converting DC supplied by the battery-pack to AC for activating the fifth and sixth motor/generators (MG1) (MG2), and for converting the AC supplied by the fifth and sixth motor/generators (MG1) (MG2) into DC for recharging the battery-pack (HV).

Step 3. A second battery charger (BC) adjacent the second twin inverter (IN2), the second battery charger (BC) and second twin inverter (IN2) are connected to the first, second, third, and fourth battery (b1)(b2)(b3)(b4) for activating the second twin inverter (IN2).

Step 4. The second battery charger is connected to a conventional outlet of the second twin inverter (IN2) by a second plug (2), and the second motor/generator (MG2) is connected to the first twin inverter (IN1) via a third plug (3). The charger is thus capable of charging the first, second, third, and fourth batteries (B1) (B2) (B3) (B4) for supplying energy to the vehicle by the first motor/generator (MG1) via the first and second twin inverters (IN1) (IN2).

Step 5. The first and second twin inverters (IN1) (IN2) being connected to the battery-pack (HV) via eight terminals (T1) (T2) (T3) (T4) (T5) (T5) (T7) (T8) such that the battery pack (HV) can act as an internal source of energy to the twin inverters (IN1) (IN2).

Figure 7:
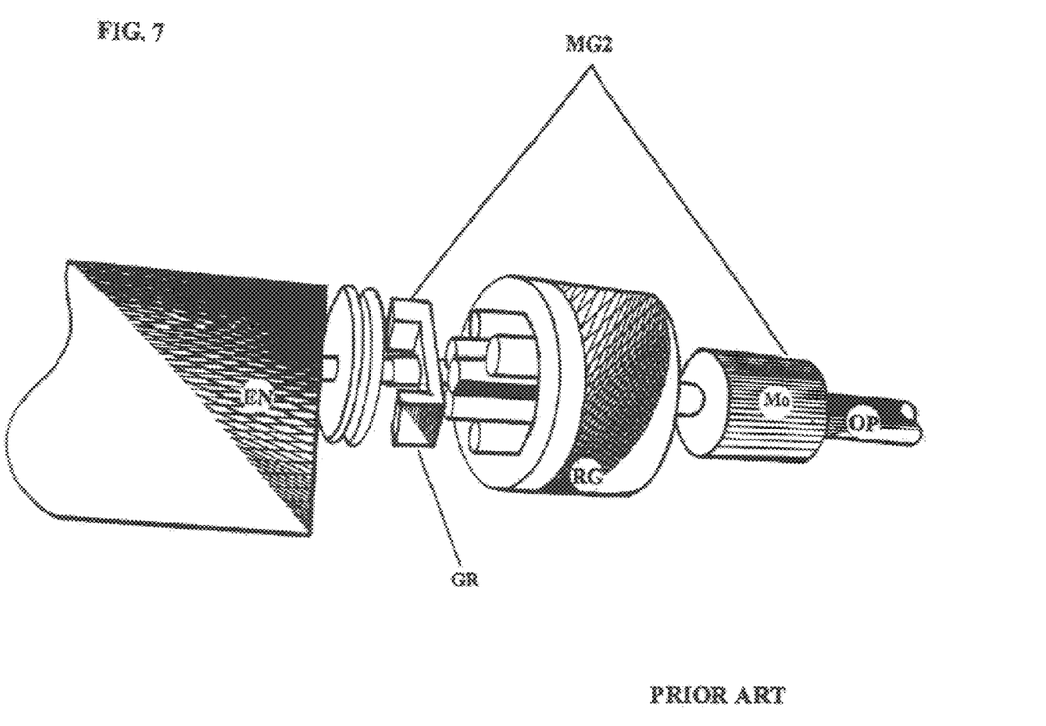
FIG. 7 is a prior art perspective view of a gasoline engine connected to a conventional carrier, a generator via a second motor/generator, a ring gear, a hybrid electric motor and an out-put shaft.

Step 6. The first and second motor/generators (MG1) (MG2) can function as the internal source of energy to the twin inverters (IN1) (IN2). The motor/generators are not only sources of propulsion but sources of power generation. Any permanent magnet motor can operate as either a motor or a generator. In any vehicle design there must be a mechanical connection between the motor/generator and the drive train. In all-electric vehicles, there could be an individual motor/generator at each wheel, or a central motor generator connected to the drive train through a gearbox (RG) as seen in FIG. 7. In a hybrid the motor/generator could be an individual component which is capable of being driven by an accessory belt from the engine (EN), like an alternator of a conventional vehicle. The motor/generator could be bolted between the engine (EN) and the power splitting apparatus (PS) or it could be multiple motor/generators mounted inside the power splitting apparatus. In either case the motor/generator must be capable of propelling the vehicle as well as being driven by the vehicle in a regenerative mode.

Step 7. Using an electronic throttle control system, which is conventional in hybrids and all-electric vehicles, when the throttle pedal is pushed a signal is sent to the onboard computer. The onboard computer activates a relay in the controller that sends battery current through twin inverters (IN1) (In2) to the second motor generator (MG2) to cause the vehicle to move. The harder the pedal is pushed the more current flows under direction of a variable resistance controller and the faster the vehicle is sent on its course of travel. In a hybrid, depending on the load, battery state-of-charge and the design of the hybrid drive, a heavy throttle will also activate the internal combustion engine (EN) for more power. Lifting off the throttle will decrease the current flow to the motor and the vehicle will slow down. Lifting completely off the throttle will cause the current to switch direction whereby the motor/generator MG1 switches from a motor mode to a generator mode and begin the regenerative braking process. When the electronic throttle is closed and the vehicle is still moving, all of its kinetic energy can be captured to both slow the vehicle and recharge the first, second, third, and fourth batteries (B1)(B2)(B3)(B4).

When the onboard computer signals the batteries to stop sending electricity (via the controller relay) and start receiving it (through a charge controller) the second motor/generator (MG2) simultaneously stops receiving electricity for powering the vehicle, and starts sending current back to the batteries for charging. When the second motor/generator (MG2) is supplied with electricity it makes mechanical power, and when it is supplied with mechanical power it makes electricity. The vehicle is slowed by ways of friction. Although effective on their own a regenerative brake must be combined with a conventional friction brake to ensure proper deceleration for different driving situations.

Figure 6:
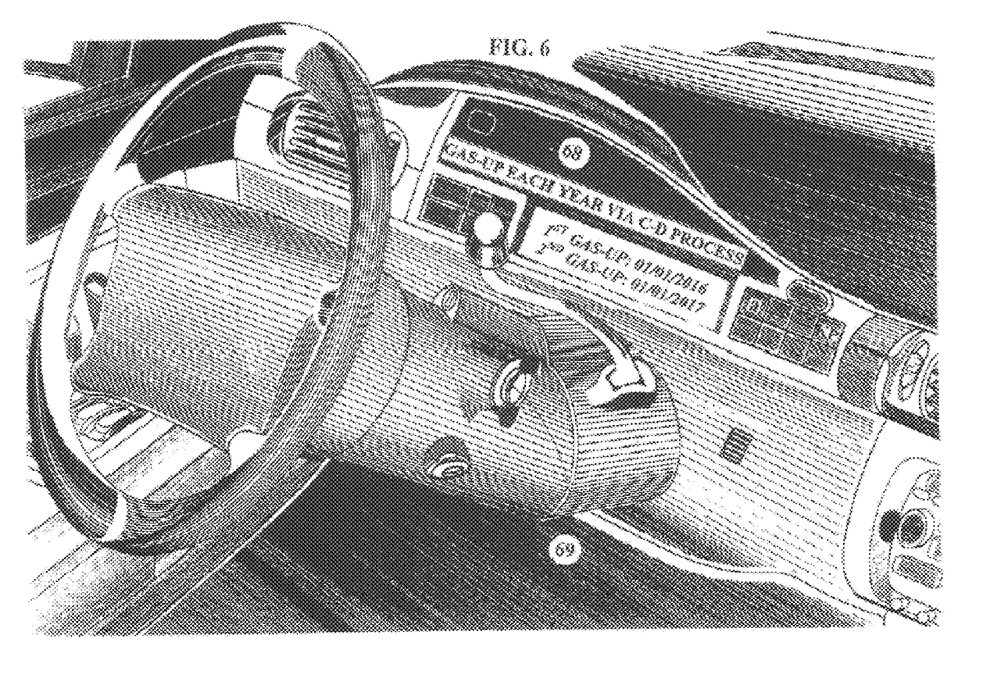
FIG. 6 is a perspective view of an instrument panel readout screen when an ignition key has activated the readout screen.

FIG. 6 shows an example of an instrument panel read-out screen (68) which recites information related to the date when the vehicle has been previously filled with fuel, and the ignition (69) for receiving an ignition key to turn on the vehicle.

Figure 8:
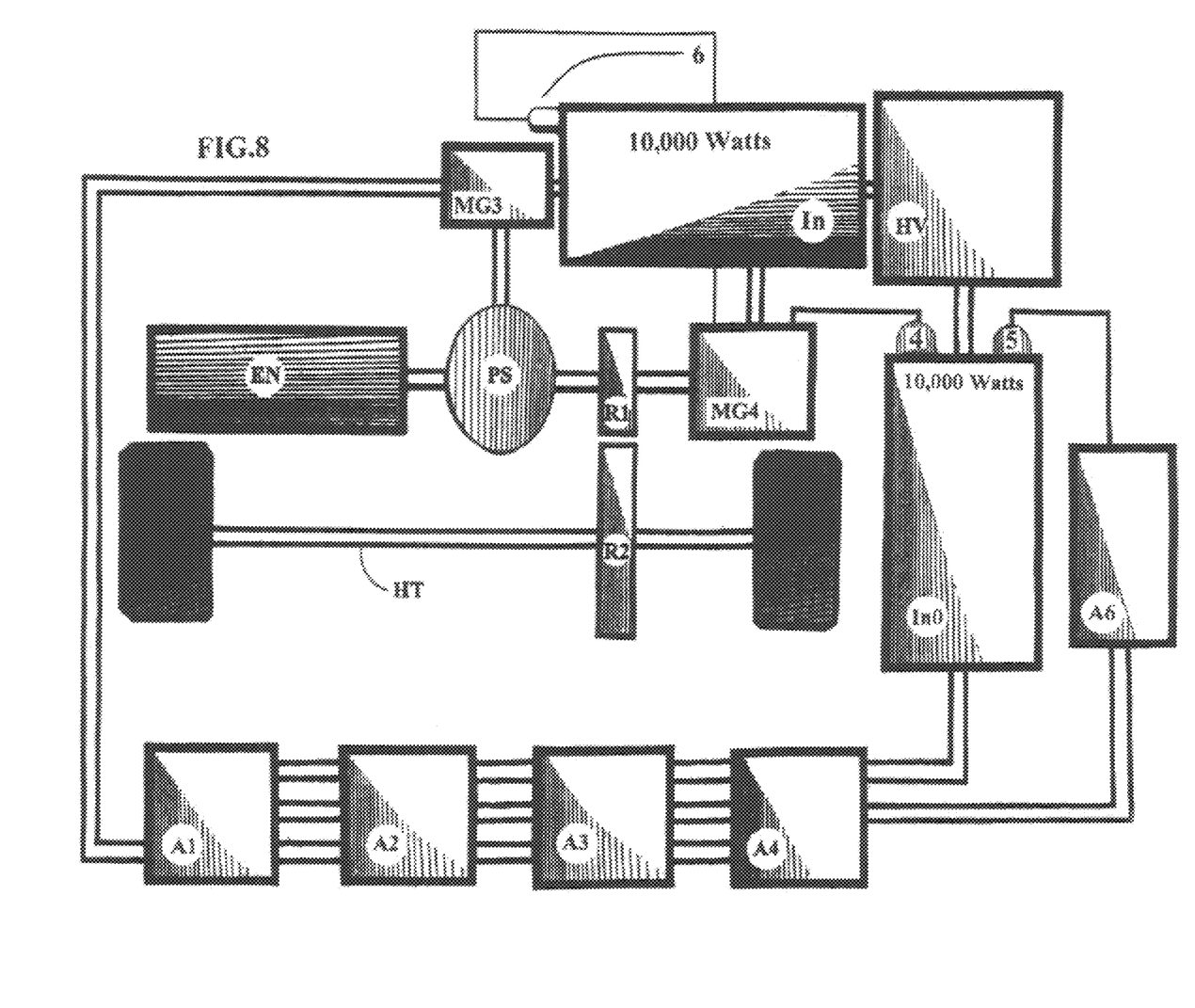
FIG. 8 is a block diagram of a luxury hybrid vehicle drive system having first and second twin 10,000 Watt inverters, first second third, and fourth batteries, a battery charger, a battery pack, a conventional internal combustion engine, a power splitter, first and second motor/generators and drive train reduction gears with respect to the above modifications.
Figure 10:
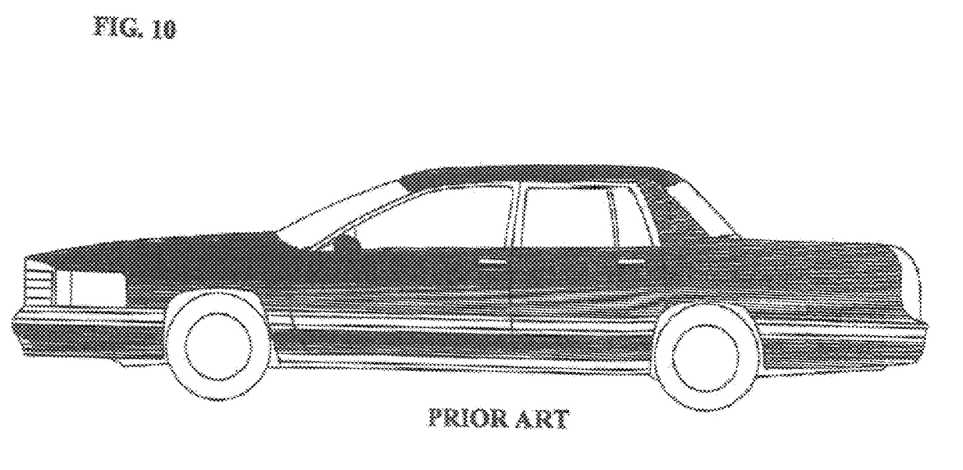
FIG. 10 is a side view of a prior art luxury vehicle which instant drive system is intended to be installed within.

FIG. 8 shows the same drive system as disclosed by FIG. 1, however applied to the second luxury vehicle embodiment where the first end second twin inverters (IN) (IN0) instead are 10,000 Watt inverters. The interconnections of the first, second, third, and fourth batteries (A1) (A2) (A3) (A4), the first and second motor/generators (MG3) (MG4) the Battery-pack (HV), the battery charger (A6), the reduction gears (R1) (R2), the Internal combustion engine (EN) and the power switching apparatus (PS) are the same. FIG. 10 shows an example of a luxury vehicle which the drive system is intended to be installed.

Figure 8A:
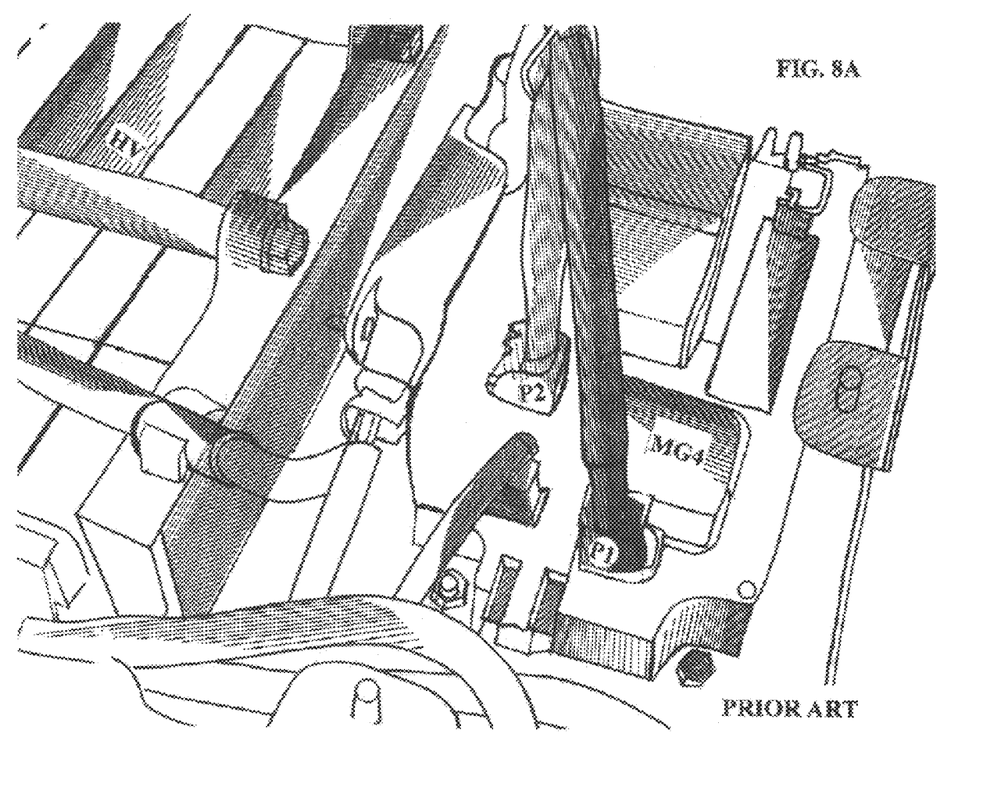
FIG. 8a is a prior art view of a conventional connection between a battery-pack and a motor for a hybrid vehicle.

FIG. 8a shows an example of the second motor/generator (Mg4) of the second luxury vehicle embodiment being connected to the battery-pack (HV) using plugs (p1) and (p2).

Figure 8B:
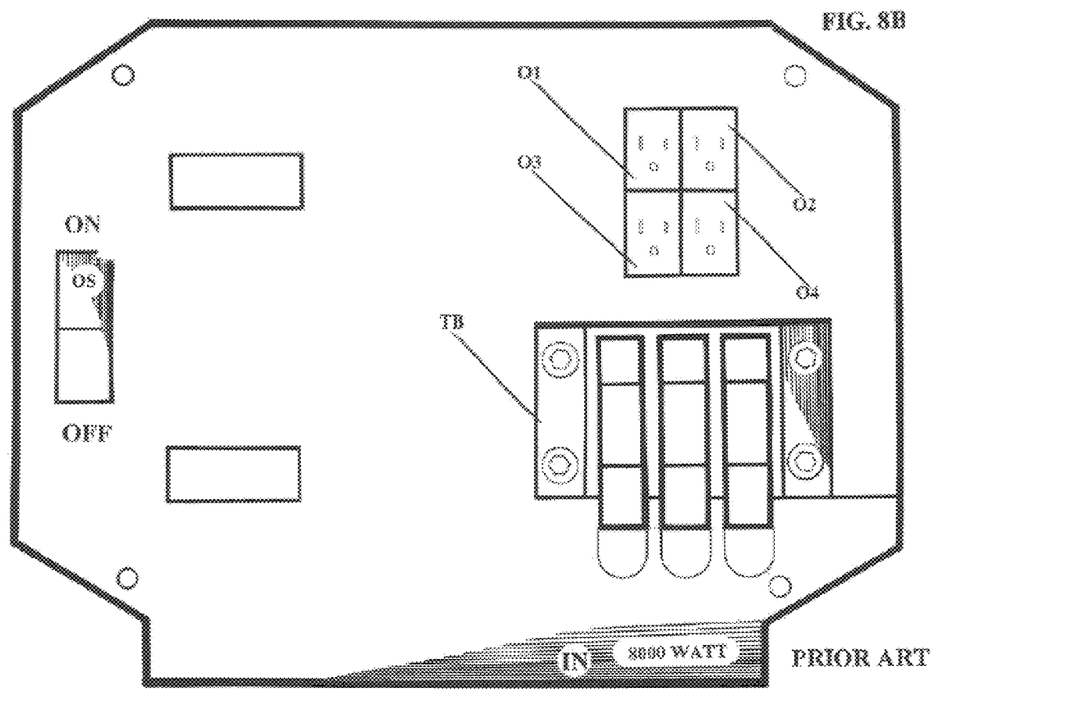
FIG. 8b is a front view of a prior art 8,000 watt remote control inverter having a hard wire direct terminal block including a switch and four conventional outlets near the terminal block.
Figure 8C:
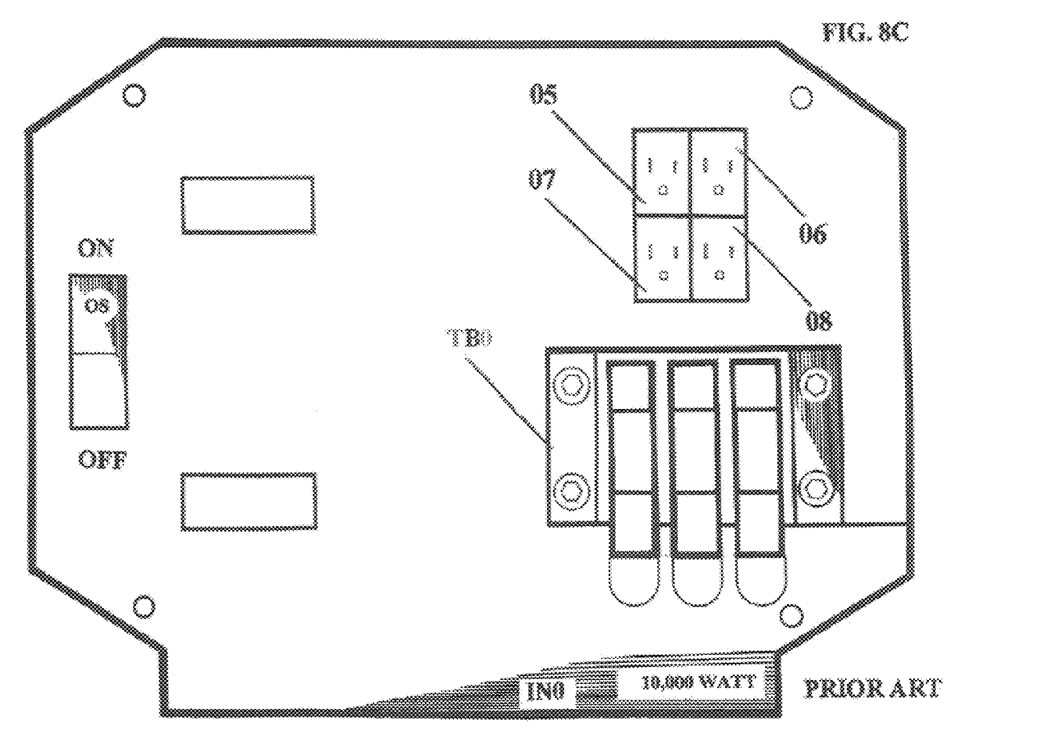
FIG. 8c is a front view of a prior art 10,000 watt remote control inverter having a hard wire direct terminal block including a switch and four conventional outlets near the terminal block.
Figure 8D:
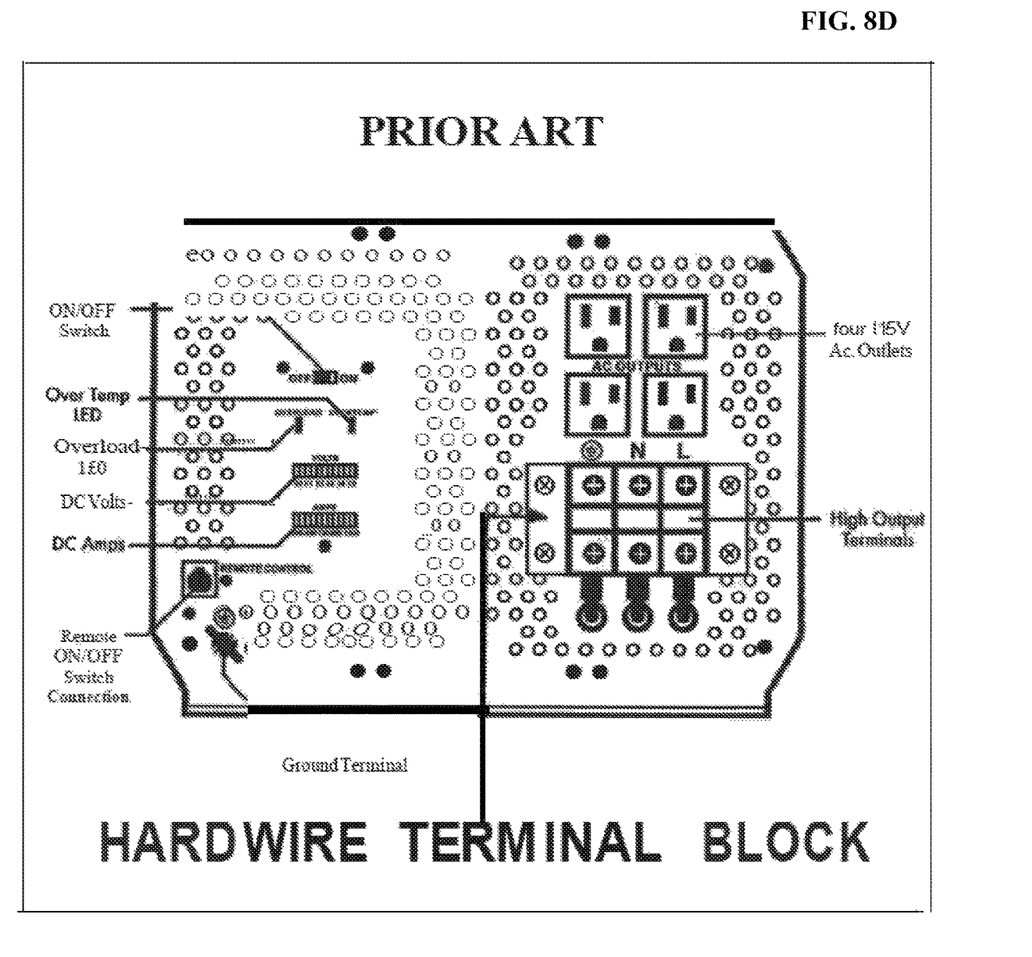
FIG. 8d is a hard wiring diagram for a prior art twin inverter.

FIGS. 8b and 8c shows a portion of the first and second twin inverters of the mid-sized vehicle embodiment (FIG. 8b) and the luxury vehicle embodiment (FIG. 8c). While the mid-sized vehicle embodiment is an 8,000 Watt inverter the luxury vehicle embodiment is a 10,000 watt inverter. Both inverters include a respective on/off switch (OS), four conventional outlets, (01) (02) (03) (04) on the 8,000 watt inverter and (05) (06) (07) (08) on the 10,000 Watt inverter, and a respective terminal block (TB). It is contemplated the heavy-duty 12,000 Watt inverter would be of similar construction. FIG. 8d shows an alternate embodiment of the twin inverters where a remote on/off switch connection and various indicators are included.

Figure 9:
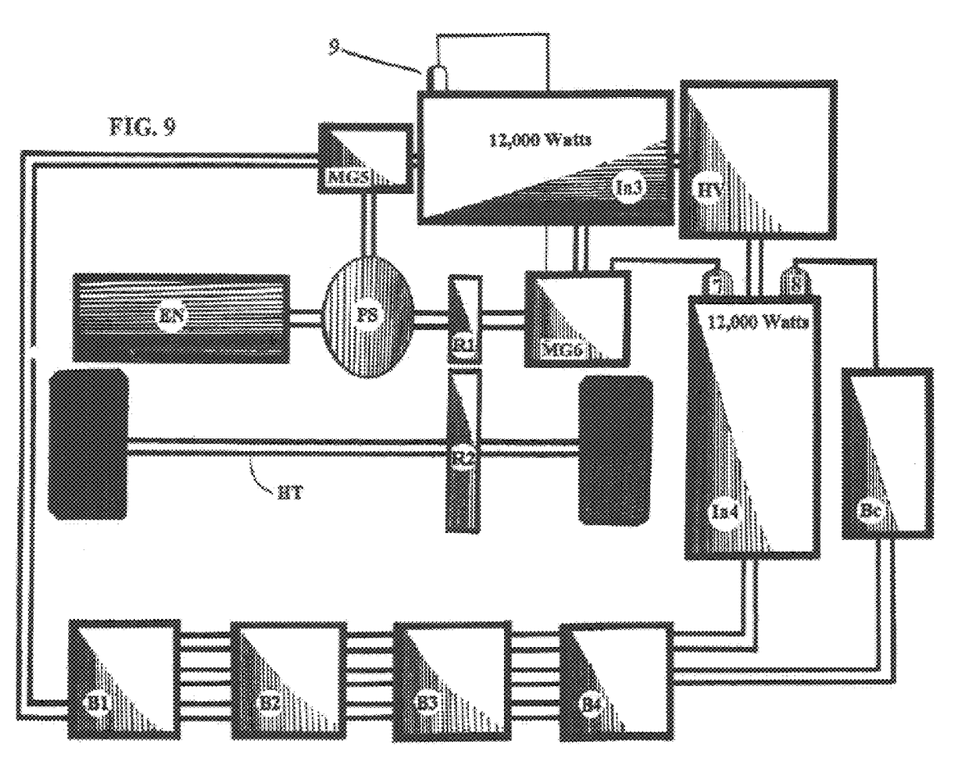
FIG. 9 is a block diagram of a heavy-duty hybrid vehicle drive system having first and second twin 12,000 Watt inverters, first, second third, and fourth batteries, a battery charger, a battery pack, a conventional internal combustion engine, a power splitter, first and second motor/generators and drive train reduction gears with respect to the above modifications.

FIG. 9 shows the same drive system as disclosed by FIGS. 1 and 8, but with components adapted for the third heavy-duty vehicle embodiment where the first end second twin inverters (IN3)(IN4) instead are 12,000 Watt inverters. The interconnections of the first, second, third, and fourth batteries (B1) (B2) (B3) (B4), the first and second motor/generators (MG5) (MG6) the Battery-pack (HV), the battery charger (BC), the reduction gears (R1) (R2), the Internal combustion engine (EN) and the power switching apparatus (PS) are the same.

I claim:

1. A system for applying gasoline to a hybrid vehicle fuel tank less frequently than a conventional internal combustion engine driven vehicle comprising:

an internal combustion engine connected to a power splitting apparatus;

a first motor/generator also connected to the power splitting apparatus;

the power splitting apparatus connected to a first and second gear reduction connected to a drive shaft of the hybrid vehicle;

a first, second, third, and fourth battery connected to the first motor/generator;

a second motor/generator connected to the power splitting apparatus, the first and second gear reduction being located along the connection between the power splitting apparatus and the second motor/generator;

the first and second motor/generator being connected to a first twin inverter;

the second motor/generator being connected to a second twin inverter via a hard wire;

the first and second twin inverters comprising eight terminals for electronic connections and four conventional plugs;

the second twin inverter being connected to a battery-pack by way of the eight terminals;

the first motor/generator being connected to the first second, third and fourth batteries by way of a hard wire connection;

the second motor/generator being connected to the first and second twin inverters via the conventional plugs;

the first and second twin inverter connected the first, second, third and fourth batteries and the battery pack by way of the eight terminals;

a battery charger connected to the second twin inverter via the conventional plug and connected via a hardwire to the first second third and fourth batteries;

an electronic control unit for activating a plurality of relays within said first and second twin inverters to allow the inverter to control a flow of electricity to and from the battery-pack and the first, second, third and fourth batteries by controlling the flow of electricity through a respective one or more of each of the first and second twin inverters eight terminals;

wherein the first and second motor/generator can be used to provide a driving force to the vehicle independent from and in tandem with the internal combustion engine depending on a user's requirements, by selectively supplying a power from the battery-pack and the first, second, third and fourth batteries, wherein the power can be supplied completely by the battery-pack, or at least one of the first, second, third, and fourth batteries independently or in tandem by the electronic control unit controlling the plurality of relays of the first and second twin inverters to control the flow of electricity from the connected components;

wherein the internal combustion engine can be used to provide a driving force to the vehicle independent from the battery-pack or the first, second, third, and fourth batteries such that the first and second motor/generators can be used to generate power to selectively recharge the battery-pack, the first, second, third, or fourth battery by way of the electronic control unit controlling the plurality of relays first and second twin inverters to control the flow of electricity to the connected components;

wherein when the vehicle is moving and a driving force is not required to maintain a speed of the vehicle, the internal combustion engine does not supply power and the first and second motor/generators generate electricity to selectively recharge the battery-pack, the first, second, third or fourth battery by the electronic control unit controlling plurality of-relays of the first and second twin inverters to control the flow of electricity to the connected components;

wherein the system can also perform a regenerative breaking process where the internal combustion engine does not supply power and first and second motor generators generate electricity to selectively recharge the battery-pack, the first, second, third or fourth battery by the electronic control unit controlling plurality of-relays of the first and second twin inverters to control the flow of electricity to the connected components by way of a kinetic energy of the vehicle while utilizing a friction force to assist in a slowing of said vehicle.

* * * * *